United States Patent
Yoshii et al.

(10) Patent No.: US 7,369,621 B2
(45) Date of Patent: May 6, 2008

(54) RADIO COMMUNICATION BASE STATION DEVICE, RADIO COMMUNICATION MOBILE STATION DEVICE, AND RADIO COMMUNICATION METHOD

(75) Inventors: Isamu Yoshii, Urayasu (JP); Mitsuru Uesugi, Yokosuka (JP); Toshiyuki Uehara, Yokohama (JP); Akihiko Nishio, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 10/516,182

(22) PCT Filed: Jul. 3, 2003

(86) PCT No.: PCT/JP03/08458

§ 371 (c)(1),
(2), (4) Date: Nov. 30, 2004

(87) PCT Pub. No.: WO2004/006469

PCT Pub. Date: Jan. 15, 2004

(65) Prior Publication Data

US 2005/0164740 A1   Jul. 28, 2005

(30) Foreign Application Priority Data

Jul. 5, 2002   (JP) .............................. 2002-197772

(51) Int. Cl.
*H04L 23/02* (2006.01)
(52) U.S. Cl. .................. 375/261; 455/522; 455/561; 455/102; 455/503; 375/265
(58) Field of Classification Search ............... 375/242, 375/265; 455/205, 102, 228, 293, 295, 522
See application file for complete search history.

(56) References Cited

U.S. PATENT DOCUMENTS 7,043,210 B2 *   5/2006   Zhu et al. .................... 455/102

(Continued)

FOREIGN PATENT DOCUMENTS

JP            07162375          6/1995

(Continued)

OTHER PUBLICATIONS

English translation of Korean office Action dated May 17, 2006.
Korean Office Action dated May 17, 2006.

(Continued)

*Primary Examiner*—Mohammed Ghayour
*Assistant Examiner*—Sonia J King
(74) *Attorney, Agent, or Firm*—Dickinson Wright, PLLC

(57) ABSTRACT

In order to perform appropriate reception quality control on each mobile station in a multimedia broadcast/multicast service, a layered coding section 101 encodes input data by dividing the input data into two layers and obtains a first layer code string and a second layer code string. The first layer code string is input to a CRC code addition section 102 and a CRC code for an error inspection is added thereto at every predetermined block. On the other hand, the second layer code string is input to a CRC code addition section 103 and a CRC code for an error inspection is added thereto at every predetermined block. The first layer code string and the second layer code string with the CRC codes added are input to a layered modulation section 104 and the layered modulation section 104 modulates a plurality of code strings coded by being divided into a plurality of layers in such away that error rates differ hierarchically among the plurality of code strings and a radio section 105 sends the modulated symbol.

1 Claim, 16 Drawing Sheets

U.S. PATENT DOCUMENTS

| | | | |
|---|---|---|---|
| 7,046,975 | B2 * | 5/2006 | Golitschek Edler Von Elbwart et al. .................... 455/205 |
| 2001/0046877 | A1 * | 11/2001 | Ohkubo et al. ............ 455/522 |
| 2003/0081576 | A1 * | 5/2003 | Kim et al. ................. 370/335 |
| 2003/0103575 | A1 * | 6/2003 | Birru et al. ................ 375/265 |
| 2003/0142658 | A1 * | 7/2003 | Ofuji et al. ................ 370/349 |
| 2004/0014482 | A1 * | 1/2004 | Kwak et al. ............... 455/522 |
| 2005/0186912 | A1 * | 8/2005 | Nakao et al. ............ 455/67.11 |

FOREIGN PATENT DOCUMENTS

| | | |
|---|---|---|
| JP | 8204768 | 8/1996 |
| JP | 09307510 | 11/1997 |
| JP | 2001 292096 | 10/2001 |
| JP | 2001 333121 | 11/2001 |
| JP | 2001 339466 | 12/2001 |
| JP | 2002 204273 | 7/2002 |
| KR | 2003 0086172 | 11/2003 |

OTHER PUBLICATIONS

Japanese Office Action dated Jul. 5, 2005 with English translation.

M. Honda, et al., "A New Radio Transmission Scheme of Configuration Data for FPGA-Based Downloadable Software Radio Communication Systems," The Institute of Electronics, Information and Communications Engineers, pp. 49-54, Oct. 2000, with partial English translation.

International Search Report dated Oct. 28, 2003.

"3rd Generation Partnership Project; Technical Specification Group Services and System Aspects; Multimedia Broadcast/Multicast Service; Stage 1 (Release 6)," 3GPP TS 22.146 v6.0.0 (Jun. 2002), Technical Specification, 3GPP Organizational Partners, 4 pages total, 2002.

"Scalable Multimedia Broadcast and Multicast Service (MBMS)," MBMS Workshop, Agenda 5, Samsung Electronics, Tdoc MBMS-0033, London, England, 4 pages total, May 6-7, 2002.

* cited by examiner

| RANKING | CIR | |
|---------|-----|---|
| 1 | 8 dB | MOBILE STATION #1 |
| 2 | 5 dB | MOBILE STATION #2 |
| 3 | 3 dB | MOBILE STATION #3 |

FIG.8

| RANKING | CIR DIFFERENCE | |
|---------|----------------|---|
| 1 | +4 dB | MOBILE STATION #1 |
| 2 | −1 dB | MOBILE STATION #2 |
| 3 | −3 dB | MOBILE STATION #3 |

FIG.10

| RANKING | CIR DIFFERENCE | |
|---------|----------------|---|
| 1 | +5 dB | MOBILE STATION #1 |
| 2 | +4 dB | MOBILE STATION #2 |
| 3 | +2 dB | MOBILE STATION #3 |

FIG.11

RADIO COMMUNICATION BASE STATION DEVICE, RADIO COMMUNICATION MOBILE STATION DEVICE, AND RADIO COMMUNICATION METHOD

TECHNICAL FIELD

The present invention relates to a radio communication base station apparatus, radio communication mobile station apparatus and radio communication method.

BACKGROUND ART

In the field of mobile communications, technological studies on multimedia broadcast/multicast service (hereinafter referred to as "MBMS") are underway recently. Communications carried out in MBMS are not point to point (P-to-P) communications, but point to multi (P-to-M) communications. That is, in an MBMS, one radio communication base station apparatus (hereinafter referred to as "base station") sends the same information to a plurality of radio communication mobile station apparatuses (hereinafter referred to as "mobile stations") simultaneously.

The MBMS has a broadcast mode and multicast mode. While the broadcast mode is a mode in which information is sent to all mobile stations as with current radio broadcasting, the multicast mode is a mode in which information is sent to only specific mobile stations affiliating a news group or other services.

Advantages in carrying out the MBMS include the following: That is, when each mobile station receives information sent from a base station through a streaming service, etc., using one channel, if the number of mobile stations requesting the information increases, the load on the radio channel increases. However, when the MBMS is used, even if the number of mobile stations increases, all those mobile stations receive the information using the same channel, and therefore it is possible to increase the number of mobile stations capable of receiving the information without increasing the load on the radio channel. Currently, distribution of traffic information, music distribution, news distribution at a station, distribution of live coverage of a sport event, etc., are considered as services available using the MBMS and providing these services at a transmission rate of approximately 8 to 256 kbps is under study.

Here, when an attempt is made to provide high reception quality in an MBMS for a mobile station located on a cell boundary, this results in excessive reception quality for mobile stations located close to a base station, producing waste. In this case, transmit power of a signal to be sent to the mobile station located on the cell boundary grows extremely and causes a reduction of the subscriber capacity of the entire system as a consequence.

DISCLOSURE OF INVENTION

It is an object of the present invention to provide a radio communication base station apparatus, radio communication mobile station apparatus and radio communication method capable of performing appropriate reception quality control over each mobile station in an MBMS.

In order to solve the above described problems and attain the above described object, the present invention is characterized in that a plurality of code strings which is coded by being divided into a plurality of layers is modulated in such a way that error rates differ hierarchically among the plurality of code strings.

With this feature, even in the case such as an MBMS where the same information is sent to a plurality of mobile stations, transmission rates and reception quality are divided hierarchically according to their distances from the base station, and therefore it is possible to provide services at a high transmission rate and of high quality for mobile stations located near the base station on one hand, and provide services at a low transmission rate and of low quality with a minimum transmission rate and minimum quality guaranteed for mobile stations located on the cell boundary on the other.

BRIEF DESCRIPTION OF DRAWINGS

FIG. 8 illustrates a result of ranking according to Embodiment 2 of the present invention;

FIG. 10 illustrates a result of ranking according to Embodiment 3 of the present invention;

FIG. 11 illustrates a result of ranking according to Embodiment 3 of the present invention;

BEST MODE FOR CARRYING OUT THE INVENTION

With reference now to the attached drawings, embodiments of the present invention will be explained in detail below.

Embodiment 1

Figure 1:
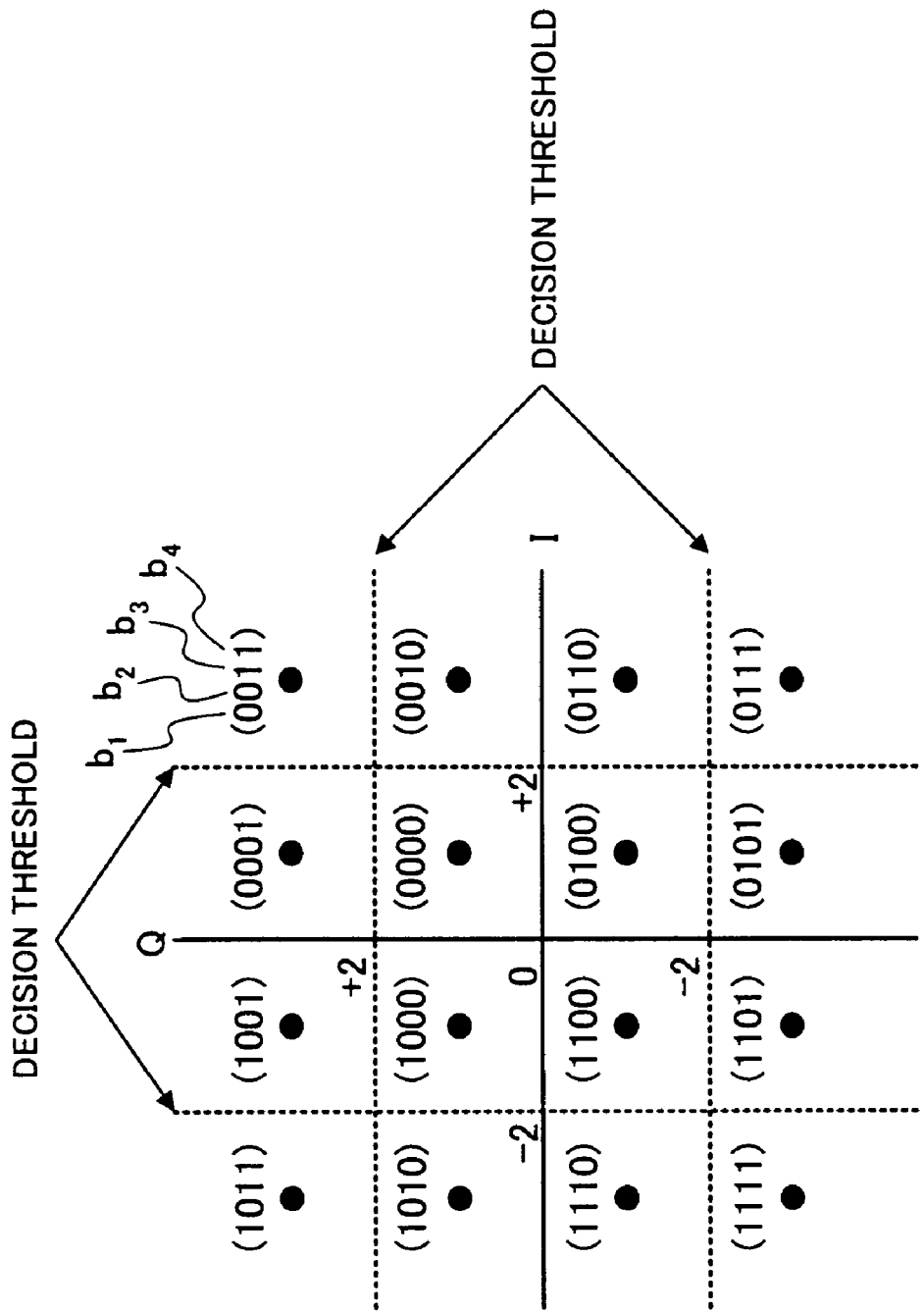
FIG. 1 is a signal section diagram showing a 16QAM signal point arrangement.

Among modulation schemes, there is a multi-value modulation scheme capable of transmitting a plurality of bits with one symbol. The multi-value modulation scheme includes a QPSK (Quardrature Phase Shift Keying) which transmits 2 bits with one symbol, 16QAM (Quadrature Amplitude Modulation) which transmits 4 bits with one symbol and 64QAM which transmits 6 bits with one symbol, etc. For example, with the 16QAM, it is possible to transmit 4-bit information with one symbol by arranging 16 symbol points at different positions on the IQ plane. It is a signal space diagram that shows this symbol point arrangement. Taking a 16QAM as an example of a multi-value modulation scheme, a 16QAM signal space diagram will be explained. FIG. 1 is a signal section diagram showing a 16QAM symbol point arrangement.

As shown in FIG. 1, the 16QAM performs amplitude modulation with four values on each of the I-axis and Q-axis and thereby arranges 16 symbol points at different positions on the IQ plane. Using multi-values in this way allows 4-bit information to be transmitted with one symbol. When multi-values are used in this way, in order to improve a bit error rate characteristic, symbol points are arranged in such a way that one symbol differs from another neighboring symbol by only one bit as shown in FIG. 1. This is called "gray coding."

In the case of the 16QAM, the error rate of each bit within one symbol varies depending on the bit position. That is, in the case of the 16QAM, the third bit and fourth bit have a higher error rate than the first bit and the second bit. This will be explained below. As shown in FIG. 1, a case where decision thresholds are set to +2, 0 and −2 for both the I channel and Q channel will be explained.

FIG. 2A to FIG. 2D illustrate a 16QAM decision method. Black bullets in FIG. 2A to FIG. 2D are the respective symbol points shown in FIG. 1 and the assignment of bits in each symbol is also the same as that shown in FIG. 1. In this case, bits of each symbol are decided as follows.

Figure 2:
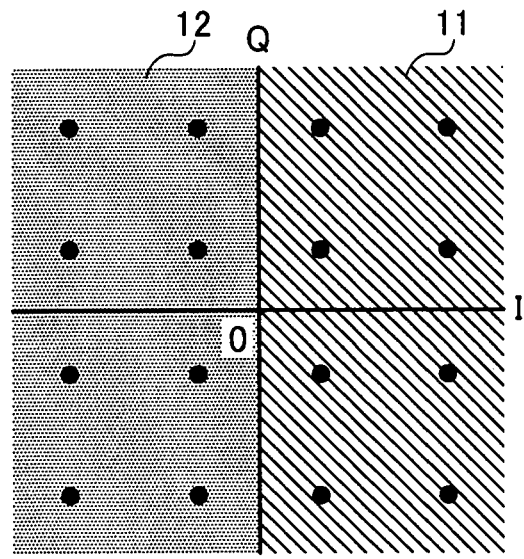
FIG. 2A illustrates a decision method according to 16QAM.
FIG. 2B illustrates a decision method according to 16QAM.
FIG. 2C illustrates a decision method according to 16QAM.
FIG. 2D illustrates a decision method according to 16QAM.
Figure 2:
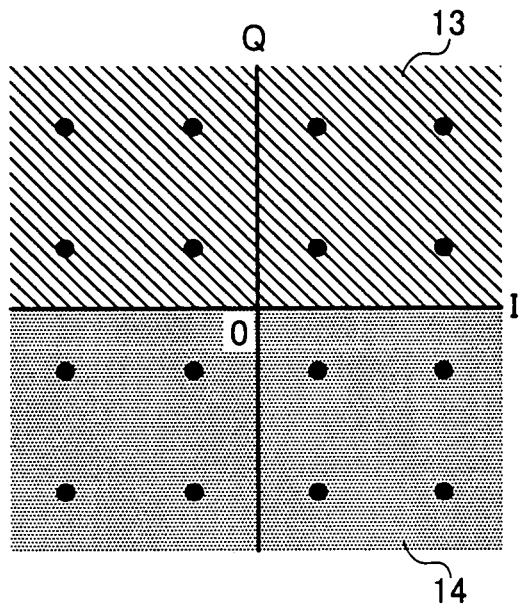
Figure 2:
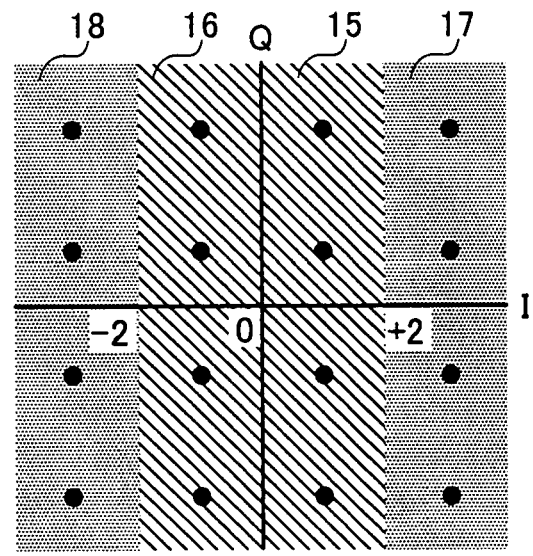
Figure 2:
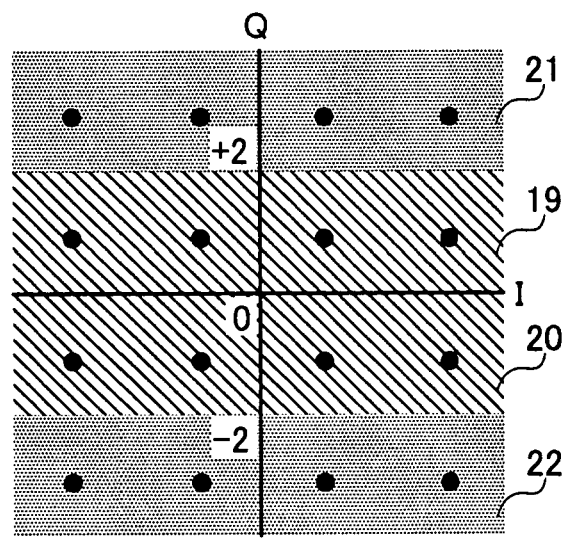

That is, in FIG. 1, when attention is focused on the most significant bit (first bit) b1, the plus area on the I-axis (right-hand area with respect to the Q-axis) 11 is '0' and the minus area on the I-axis (left-hand area with respect to the Q-axis) 12 is '1'. Therefore, as shown in FIG. 2A, on the receiver side, when a received symbol is located in the plus area 11 of the I-axis, b1 is decided to be '0' and when the received symbol is located in the minus area 12 of the I-axis, b1 is decided to be '1'. That is, by only deciding in which of the two areas the received symbol exists, it is possible to decide whether b1 is '0' or '1'. In other words, with regard to b1, it is possible to decide whether b1 is '0' or '1' by deciding whether the value on the I-axis is positive or negative.

Then, in FIG. 1, when attention is focused on the second highest bit (second bit) b2, the plus area on the Q-axis (upper area with respect to the I-axis) 13 is '0' and the minus area on the Q-axis (lower area with respect to the I-axis) 14 is '1'. Therefore, as shown in FIG. 2B, on the receiver side, when the received symbol is located in the plus area 13 of the Q-axis, b2 is decided to be '0' and when the received symbol is located in the minus area 14 of the Q-axis, b2 is decided to be '1'. That is, by only deciding in which of the two areas the received symbol exists, it is possible to decide whether b2 is '0' or '1'. In other words, with regard to b2, it is possible to decide whether b2 is '0' or '1' by deciding whether the value on the Q-axis is positive or negative.

Then, in FIG. 1, when attention is focused on the third highest bit (third bit) b3, an area 15 which is equal to or greater than 0 and smaller than +2 and an area 16 which is equal to or greater than −2 and smaller than 0 on the I-axis are '0' and an area 17 which is equal to or greater than +2 and an area 18 which is smaller than −2 on the I-axis are '1'. Therefore, on the receiver side, as shown in FIG. 2C, when the received symbol is located in the area 15 which is equal to or greater than 0 and smaller than +2 on the I-axis or the area 16 which is equal to or greater than −2 and smaller than 0, b3 is decided to be '0' and when the received symbol is located in the area 17 which is equal to or greater than +2 on the I-axis or the area 18 which is smaller than −2, b3 is decided to be '1'. That is, it is necessary to decide in which of the four areas the received symbol is located to decide whether b3 is 0 or 1.

Then, in FIG. 1, when attention is focused on the least significant bit (fourth bit) b4, an area 19 which is equal to or greater than 0 and smaller than +2 on the Q-axis and an area 20 which is equal to or greater than −2 and smaller than 0 are '0' and an area 21 which is equal to or greater than +2 on the Q-axis and an area 22 which is smaller than −2 are '1'. Therefore, on the receiver side, as shown in FIG. 2D, when the received symbol is located in the area 19 which is equal to or greater than 0 and smaller than +2 on the Q-axis or the area 20 which is equal to or greater than −2 and smaller than 0, b4 is decided to be '0' and when the received symbol is located in the area 21 which is equal to or greater than +2 on the Q-axis or the area 22 which is smaller than −2, b4 is decided to be '1'. That is, it is necessary to decide in which of the four areas the received symbol is located to decide whether b4 is '0' or '1'.

Thus, while it is only necessary to decide in which of the two areas the received symbol is located for b1 and b2, it is necessary to decide in which of the four areas the received symbol is located for b3 and b4. Furthermore, the respective decision areas 11 to 14 are wider than the respective decision areas 15 to 22. Therefore, the probability that b1 and b2 may be decided erroneously is smaller than the probability that b3 and b4 may be decided erroneously.

What is described above is not limited to 16QAM. That is, the same applies to any multi-value modulation scheme in which one symbol includes a plurality of bits and the error rate varies from one bit to another and higher bits have smaller error rates. However, in the case of 16QAM, etc., error rates become the same for a plurality of bits. For example, with 16QAM, the first bit b1 and the second bit b2 have the same error rate and the third bit b3 and the fourth bit b4 have the same error rate.

Thus, taking advantage of the fact that the error rate of each bit varies depending on the position of the bit within a multi-value modulated symbol, this embodiment modulates a plurality of code strings coded by being divided into a plurality of layers in such a way that their error rates vary hierarchically among the plurality of code strings. That is, of the plurality of code strings, code strings whose error rate is preferred to be reduced are modulated by being assigned to higher bits of the plurality of bits making up the symbol. This will be achieved with the following configuration.

Figure 3:
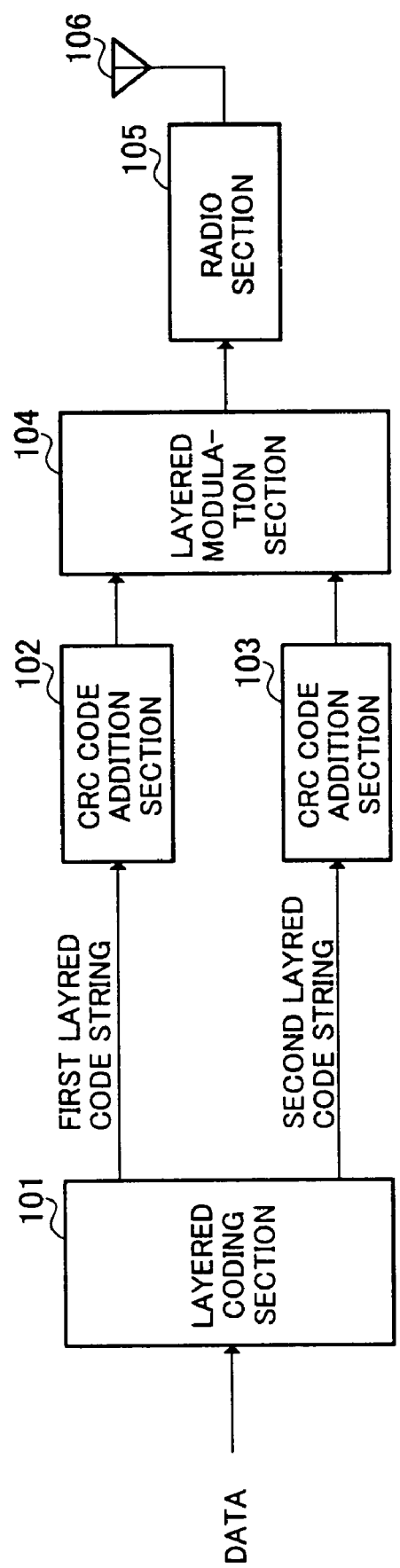
FIG. 3 is a block diagram showing a configuration of a base station according to Embodiment 1 of the present invention.

FIG. 3 is a block diagram showing a configuration of a base station according to Embodiment 1 of the present invention. The base station shown in FIG. 3 is used in a system carrying out an MBMS and sends a symbol with the same content to a plurality of mobile stations. This base station is constructed of a layered coding section 101, a CRC (Cyclic Redundancy Check) code addition section 102, a CRC code addition section 103, a layered modulation section 104, a radio section 105 and an antenna 106.

The layered coding section 101 obtains a first layer code string and a second layer code string through dividing data input into two layers and encoding those. The first layer code string is a minimum necessary code string for a mobile station to obtain decoded data through decoding. Therefore, the first layer may also be called a "base layer." Furthermore, the second layer code string is a code string additional to the first layer code string and is a code string necessary to obtain high quality decoded data through decoding at the mobile station.

Therefore, the second layer may also be called an "enhanced layer." The mobile station which is the receiver side performs decoding using both the first layer code string and the second layer code string or using only the first layer code string. That is, it is possible to obtain decoded data of higher reception quality when decoding is performed using both the first layer code string and the second layer code string than when decoding is performed using only the first layer code string.

Here, as an example, suppose both the first layer code string and the second layer code string are code strings having a transmission rate of 32 kbps. Furthermore, suppose 32 kbps is the minimum transmission rate to be guaranteed in an MBMS. In this way, when the mobile station performs decoding using both the first layer code string and the second layer code string, it is possible to obtain decoded data having a high transmission rate of 64 kbps, while when decoding is performed using only the first layer code string, it is possible to obtain decoded data having the minimum transmission rate to be guaranteed of 32 kbps. This is because the decoding using only the first layer code string uses fewer codes than the decoding using both the first layer code string and the second layer code string.

In FIG. 3, the first layer code string is input to the CRC code addition section 102 where a CRC code for an error check is added thereto at every predetermined block. Furthermore, the second layer code string is input to the CRC code addition section 103 where a CRC code for an error check is added thereto at every predetermined block. The first layer code string and the second layer code string with CRC codes added are input to the layered modulation section 104.

The layered modulation section 104 modulates the first layer code string and the second layer code string into symbols by using a multi-value modulation scheme. In this case, as described above, by taking advantage of the fact that the error rate of each bit varies depending on the position of the bit in the symbol subjected to multi-value modulation, modulation is performed in such a way that the error rates differ hierarchically between the first layer code string and the second layer code string. Here, suppose 16QAM is used as the multi-value modulation scheme. That is, since the first layer code string is a minimum necessary code string to obtain decoded data through decoding at the mobile station, in other words, a code string of greater importance than the second layer code string, a smaller error rate than the second layer code string is preferred to be. On the contrary, since the second layer code string is a code string necessary to obtain decoded data of high quality by decoding at the mobile station, in other words, it is an additional code string which is not always necessary to obtain decoded data, even if it has a larger error rate than the first layer code string and is thereby lost, it is still possible to obtain decoded data of minimum quality. Therefore, the layered modulation section 104 performs modulation by assigning the respective bits of the first layer code string to the higher 2 bits b1 and b2 in FIG. 1 and assigning the respective bits of the second layer code string to the lower 2 bits b3 and b4 in FIG. 1. Thus, the error rate of the first layer code string is smaller than the error rate of the second layer code string. That is, modulation is performed in such a way that the error rates differ hierarchically between the first layer code string and the second layer code string.

The modulated symbol is subjected to radio processing such as up-conversion at the radio section 105 and then transmitted to a plurality of mobile stations simultaneously through the antenna 106. That is, an MBMS is performed from the base station to a plurality of mobile stations. Since one symbol includes both the first layer code string and the second layer code string, the transmit power of the first layer code string is equal to the transmit power of the second layer code string.

Figure 4:
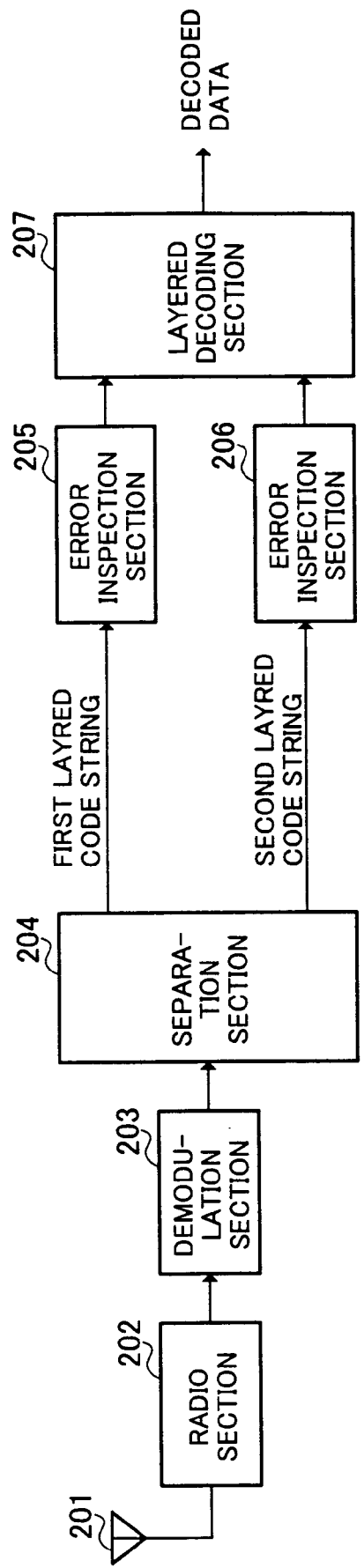
FIG. 4 is a block diagram showing a configuration of a mobile station according to Embodiment 1 of the present invention.

FIG. 4 is a block diagram showing a configuration of a mobile station according to Embodiment 1 of the present invention.

The mobile station shown in FIG. 4 is constructed of an antenna 201, a radio section 202, a demodulation section 203, a separation section 204, an error inspection section 205, an error inspection section 206 and a layered decoding section 207.

The radio section 202 applies radio processing such as down-conversion to a symbol received through the antenna 201 and inputs the received symbol to the demodulation section 203.

The demodulation section 203 demodulates the received symbol using a 16QAM demodulation scheme. The demodulated symbol is input to the separation section 204.

Since each symbol demodulated by the demodulation section 203 consists of 4 bits, the separation section 204 separates the 4 bits into higher two bits b1 and b2 and lower two bits b3 and b4. Since the first layer code string is assigned to the higher two bits and a second layer code string is assigned to the lower two bits, the 4 bits are separated into the first layer code string and the second layer code string through this separation. The first layer code string is input to the error inspection section 205 and the second layer code string is input to the error inspection section 206.

The error inspection section 205 carries out a CRC at every predetermined block to check whether the first layer code string contains some error or not. If there is some error, the code string included in the block is discarded. On the other hand, if there is no error, the code string included in the block is input to the layered decoding section 207.

The error inspection section 206 carries out a CRC at every predetermined block to check whether the second layer code string contains some error or not. If there is some error, the code string included in the block is discarded. On the other hand, if there is no error, the code string included in the block is input to the layered decoding section 207.

When there are no errors in both the first layer code string and the second layer code string, both the first layer code string and the second layer code string are input to the layered decoding section 207, and therefore the layered decoding section 207 performs decoding using both the first layer code string and the second layer code string. Thus, in this case, decoded data of 64 kbps is obtained. Furthermore, when there is no error in the first layer code string but there is some error in the second layer code string, only the first layer code string is input, and therefore decoding is performed using only the first layer code string. In this case, decoded data of 32 kbps is obtained.

Since the bit positions in the symbol of the first layer code string and the second layer code string are as shown above, no case where there is some error in the first layer code string and there is no error in the second layer code string normally occurs. Even if such a case occurs, since the second layer code string is an additional code string for the first layer code string, decoded data cannot be obtained by the second layer code string alone. Furthermore, when both the first layer code string and the second layer code string have errors, of course no decoded data is obtained.

Figure 5:
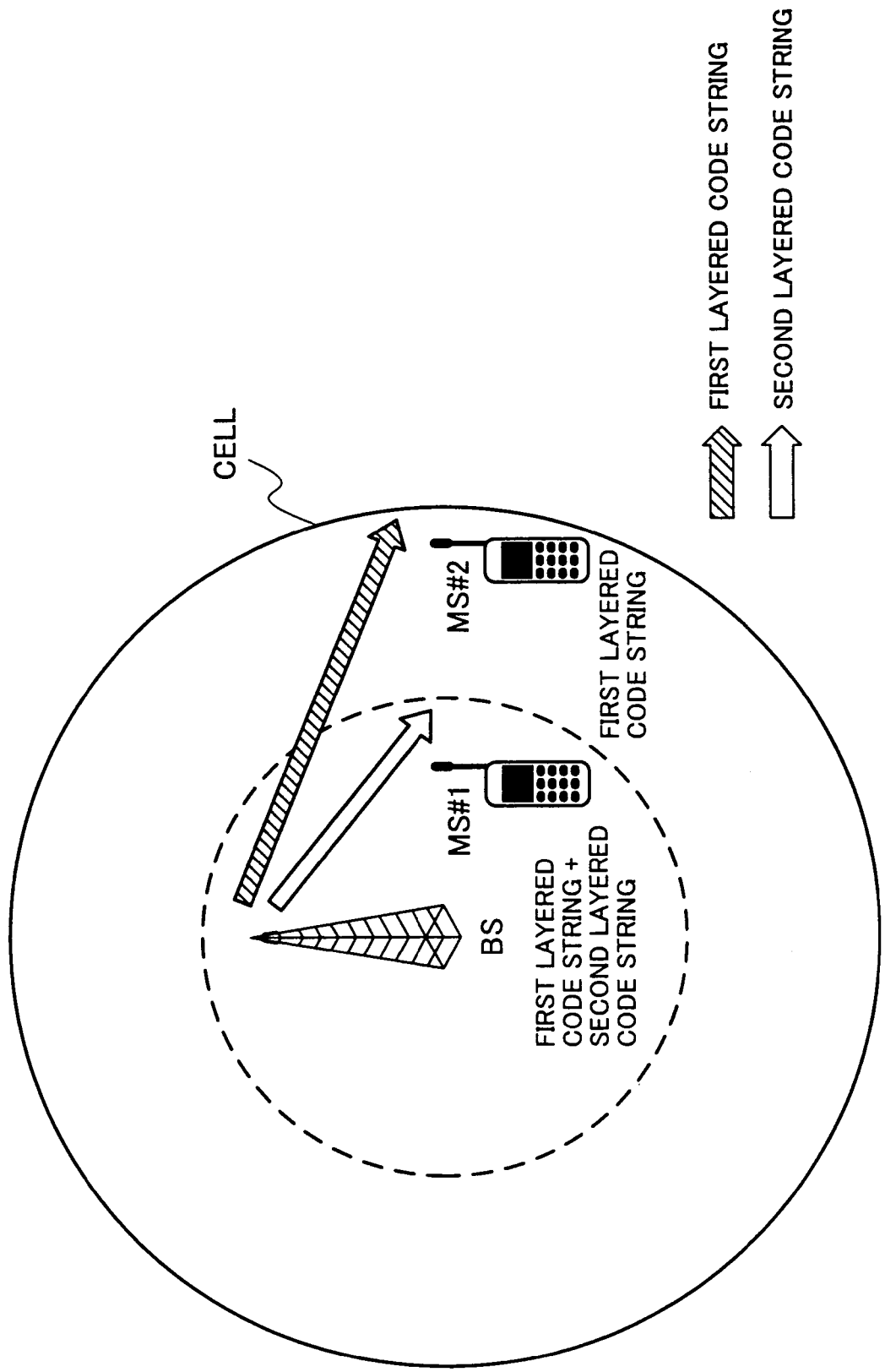
FIG. 5 illustrates a state in which code strings according to Embodiment 1 of the present invention are being sent.

Here, as shown in FIG. 5, suppose an MBMS is carried out when the mobile station #1 (MS#1) is located near the base station (BS) and the mobile station #2 (MS#2) is located on the cell boundary. As described above, the base station sends the first layer code string and the second layer code string having different error rates to the mobile station #1 and mobile station #2 with the same transmit power at the same time. Since the second layer code string has a poorer error rate characteristic than the first layer code string, even if the mobile station #1 and mobile station #2 receive the same symbol, the mobile station #1 which has a shorter distance from the base station is likely to receive both the first layer code string and the second layer code string without errors, whereas the mobile station #2 which has a greater distance from the base station is likely to receive the first layer code string without errors but second layer code string with errors. Therefore, while the mobile station #1 can receive data of 64 kbps, the mobile station #2 can receive data of 32 kbps which is a minimum guaranteed transmission data in the MBMS. Furthermore, the reception quality at the mobile station #1 is higher than the reception quality at the mobile station #2.

Thus, in this embodiment, a plurality of code strings coded by being divided into a plurality of layers is modulated in such a way that the error rates differ hierarchically among the plurality of code strings, and therefore even when a symbol of the same content is sent to a plurality of mobile stations as with an MBMS, it is possible to differentiate the transmission rate and reception quality hierarchically according to the distance from the base station. Therefore, it is possible to provide services at a high transmission rate and of high quality to a mobile station located near the base station on one hand, and provide services at a low transmission rate and of low quality to a mobile station located on the cell boundary with a minimum transmission rate and minimum quality guaranteed on the other. That is, in an MBMS, this embodiment can provide services with transmission rates and reception quality divided hierarchically.

In this embodiment, the base station carries out layered coding which encodes data divided into two layers. However, this layered coding may also be performed by a radio channel control station apparatus which is connected to the base station or a contents server which is connected to the radio channel control station apparatus. In this case, the first layer code string and the second layer code string are output in parallel from the radio channel control station apparatus or the contents server.

Furthermore, this embodiment carries out layered coding in two layers, but layered coding is not limited to two layers and all that is required is that there is at least a plurality of layers. For example, when coding is carried out in three layers, it is possible to use 64QAM as the modulation scheme and modulate a plurality of code strings coded by being divided into three layers in such a way that the error rates differ hierarchically among the plurality of code strings as with the case described above.

Embodiment 2

Excessively high transmit power of a symbol sent from a base station may cause interference with other cells or prevent resources from being assigned to other channels. On the contrary, excessively small transmit power may prevent symbols from reaching a mobile station located on a cell boundary. This makes it impossible to provide a minimum transmission rate to be guaranteed of 32 kbps to the mobile station located on the cell boundary. Therefore, this embodiment performs appropriate transmit power control in an MBMS as follows.

Figure 6:
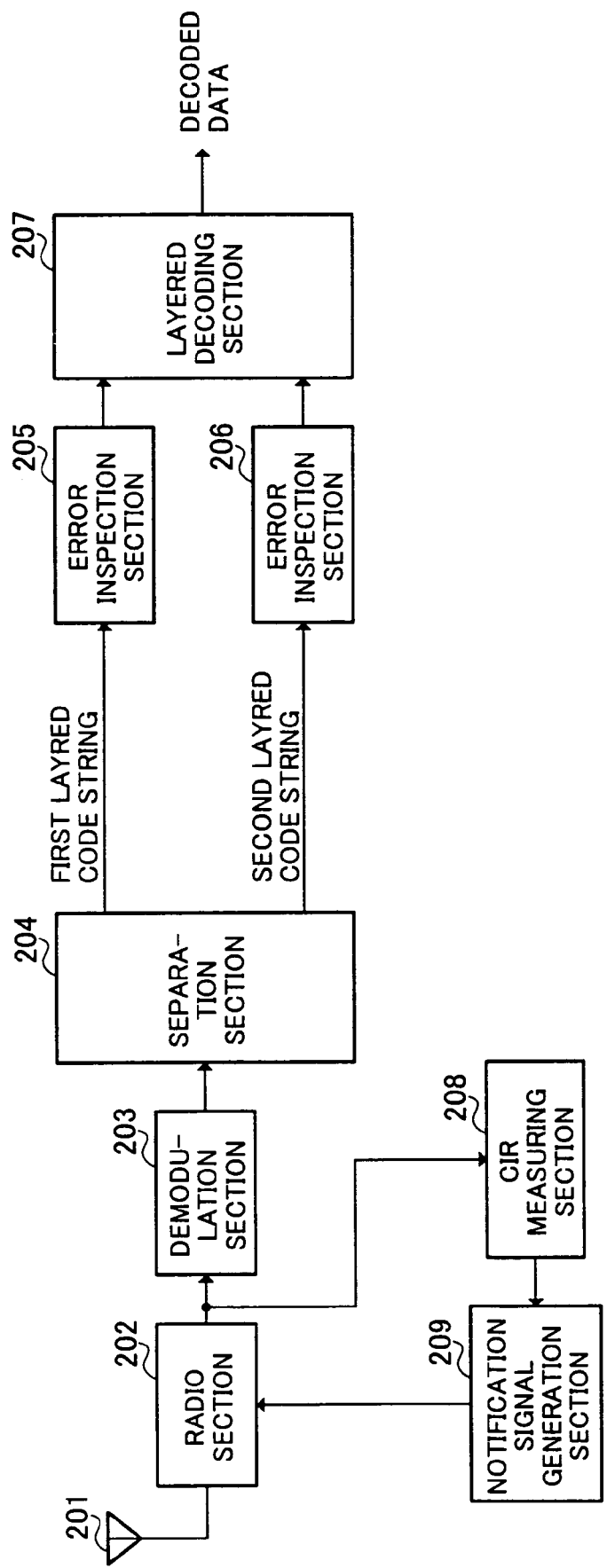
FIG. 6 is a block diagram showing a configuration of a mobile station according to Embodiment 2 of the present invention.
Figure 7:
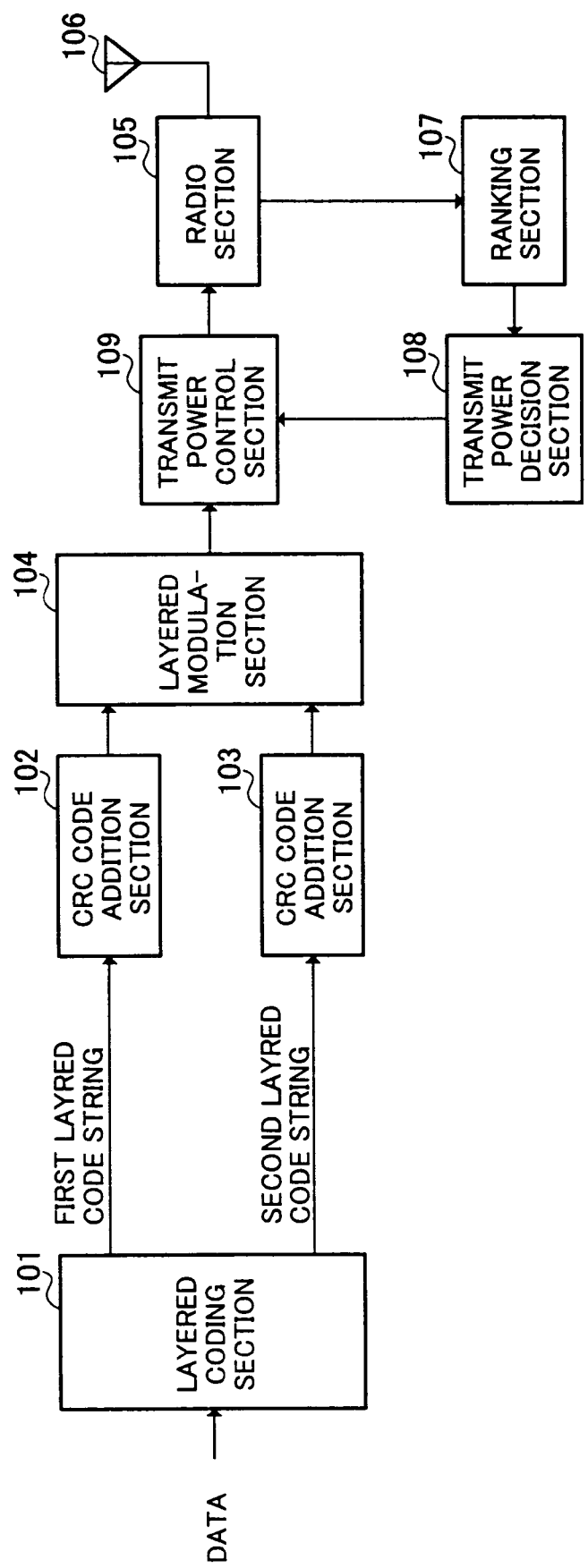
FIG. 7 is a block diagram showing a configuration of a base station according to Embodiment 2 of the present invention.

FIG. 6 is a block diagram showing a configuration of a mobile station according to Embodiment 2 of the present invention. Furthermore, FIG. 7 is a block diagram showing a configuration of a base station according to Embodiment 2 of the present invention. However, explanations of the same parts as those of the configuration in the foregoing embodiment will be omitted.

In the mobile station shown in FIG. 6, a CIR measuring section 208 measures a CIR (Carrier to Interference Ratio) as reception quality of a received symbol and inputs the value to a notification signal generation section 209. The notification signal generation section 209 generates a signal for notifying the measured CIR and inputs the signal to a radio section 202. There, the notification signal is subjected to radio processing such as up-conversion at the radio section 202 and transmitted to a base station through an antenna 201.

Since the base station sends the same symbol to a plurality of mobile stations, the base station shown in FIG. 7 receives notification signals from a plurality of mobile stations. In FIG. 7, a notification signal received through an antenna 106 is subjected to radio processing such as down-conversion at a radio section 105 and then input to a ranking section 107.

The ranking section 107 ranks CIRs notified from a plurality of mobile stations and selects a minimum CIR. The selected minimum CIR is input to a transmit power decision section 108. The transmit power decision section 108 decides transmit power of the symbol based on a difference between the minimum CIR and the CIR corresponding to the minimum transmission rate to be guaranteed (here 32 kbps) out of a plurality of transmission rates (here 64 kbps and 32 kbps) provided for the mobile station. A specific example thereof will be shown below.

For example, suppose the base station receives notification signals from three mobile stations and obtains a result of CIR ranking as shown in FIG. 8. In this case, the ranking section 107 selects 3 dB as the minimum CIR. In FIG. 8, CIR lowers in order of mobile station #1, mobile station #2 and mobile station #3, and therefore the distance of each mobile station from the base station is estimated to increase in this order. The mobile station #3 in particular is estimated to be located on the cell boundary with a high probability.

Now, suppose the CIR to obtain a minimum transmission rate to be guaranteed of 32 kbps is 2 dB. Then, 3 dB as the minimum CIR selected by the ranking section 107 exceeds the CIR necessary to obtain the transmission rate of 32 kbps by 1 dB. Thus, in this case, the transmit power decision section 108 decides to reduce the transmit power of the symbol by 1 dB and instructs it to a transmit power control section 109. Following the instruction from the transmit power decision section 108, the transmit power control section 109 decreases the transmit power of the demodulated symbol from the current level by 1 dB.

On the other hand, when the minimum CIR selected by the ranking section 107 is for example, 1 dB, the minimum CIR falls short of the CIR necessary to obtain the transmission rate of 32 kbps by 1 dB. Thus, in this case, the transmit power decision section 108 decides to increase the transmit power of the symbol by 1 dB and instructs it to the transmit power control section 109. Following the instruction from the transmit power decision section 108, the transmit power control section 109 increases the transmit power of the demodulated symbol from the current level by 1 dB.

By performing such transmit power control, at the mobile station #3 which is estimated to be farthest from the base station, the CIR of the received symbol becomes 1 dB and decoded data is obtained at the minimum transmission rate to be guaranteed of 32 kbps. Furthermore, using the minimum CIR out of the CIRs measured by a plurality of mobile stations as a reference, the base station controls transmit power in such a way that the mobile station #3 which has notified the minimum CIR has an optimum CIR to obtain the minimum transmission rate to be guaranteed, and therefore even if the transmit power has been reduced, the mobile station #1 and mobile station #2 which are estimated to be located closer to the base station than the mobile station #3 can always obtain transmission rates equal to or greater than the minimum transmission rate to be guaranteed.

As shown above, this embodiment performs transmit power control in such a way that the minimum transmission rate to be guaranteed can be maintained at a mobile station having the lowest reception CIR, and therefore it is possible to provide transmission rates equal to or greater than the minimum transmission rate to be guaranteed to all mobile stations in an MBMS and realize appropriate transmit power control with excessive transmit power reduced.

In this embodiment, a CIR is used as reception quality, but the reception quality is not limited to the CIR and reception power or an SIR (Signal to Interference Ratio) can also be used. This will also apply to the following embodiments likewise.

Embodiment 3

In this embodiment, a mobile station notifies a base station of a difference between a CIR of a received symbol and a CIR to obtain a minimum transmission rate to be guaranteed out of a plurality of transmission rates provided for the mobile station.

Figure 9:
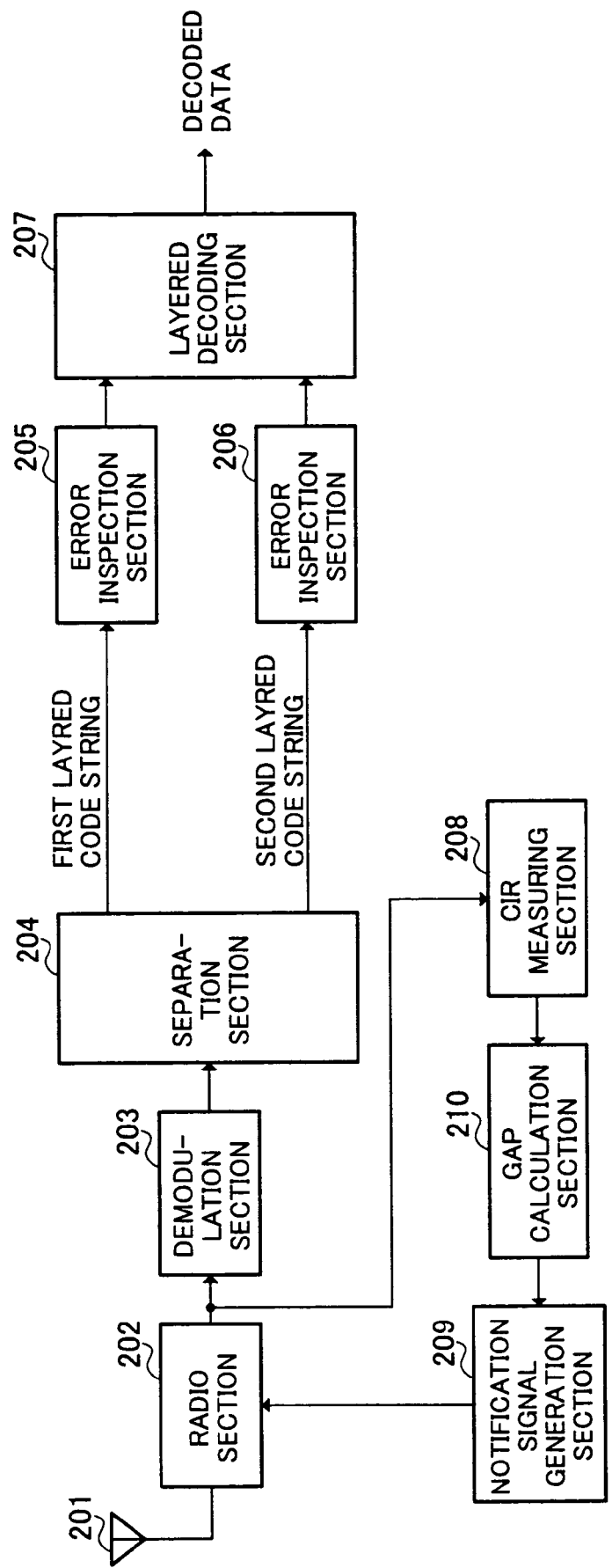
FIG. 9 is a block diagram showing a configuration of a mobile station according to Embodiment 3 of the present invention.

FIG. 9 is a block diagram showing a configuration of a mobile station according to Embodiment 3 of the present invention. However, detailed explanations of the same parts as those in the foregoing embodiment will be omitted.

In the mobile station shown in FIG. 9, a CIR measuring section 208 measures a CIR as reception quality of a received symbol and inputs the value to a gap calculation section 210. The gap calculation section 210 calculates a difference between the CIR measured by the CIR measuring section 208 and a CIR to obtain a minimum transmission rate to be guaranteed of 32 kbps and inputs the value of the CIR difference to a notification signal generation section 209. The notification signal generation section 209 generates a signal to notify the difference calculated by the gap calculation section 210 and inputs it to a radio section 202. The notification signal is subjected to radio processing such as up-conversion by the radio section 202 and sent to a base station through an antenna 201.

The configuration of the base station according to this embodiment is the same as the configuration shown in FIG. 7 above. However, the operations of a ranking section 107 and transmit power decision section 108 are different from those in the above described embodiment. The base station according to this embodiment will be explained below.

Since the base station sends the same symbol to a plurality of mobile stations, the base station shown in FIG. 7 receives notification signals from a plurality of mobile stations. In FIG. 7, a notification signal received through an antenna 106 is subjected to radio processing such as down-conversion at a radio section 105 and then input to a ranking section 107.

The ranking section 107 ranks CIR differences notified from a plurality of mobile stations and selects a value whose absolute value is largest out of differences having minus values (that is, when a CIR of a received symbol is lower than a CIR to obtain a minimum transmission rate to be guaranteed of 32 kbps). When there are no differences having minus values, the ranking section 107 selects a value whose absolute value is largest out of differences having plus values (that is, when a CIR of a received symbol is higher than a CIR to obtain a minimum transmission rate to be guaranteed of 32 kbps). The selected value is input to a transmit power decision section 108. The transmit power decision section 108 decides transmit power of the symbol based on the value of the difference input from the ranking section 107. A specific example thereof will be shown below.

For example, suppose the base station receives notification signals from three mobile stations and obtains a result of ranking of CIR difference as shown in FIG. 10. That is, this is a case where the mobile station #1 obtains a transmission rate equal to or higher than the minimum transmission rate to be guaranteed of 32 kbps, whereas the mobile station #2 and mobile station #3 cannot obtain the minimum transmission rate to be guaranteed of 32 kbps. In FIG. 10, the ranking section 107 selects −3 dB and inputs it to the transmit power decision section 108. At the mobile station #3 having a CIR difference of −3 dB, the CIR of the received symbol falls short of the CIR to obtain a transmission rate of 32 kbps by 3 dB. Therefore, in this case, the transmit power decision section 108 decides to increase the transmit power of the symbol by 3 dB and instructs the transmit power control section 109 to do so. Following the instruction from the transmit power decision section 108, the transmit power control section 109 increases the transmit power of the modulated symbol from the current level by 3 dB.

On the other hand, suppose the base station receives notification signals from three mobile stations and the result of ranking of CIR differences is as shown in FIG. 11. That is, this is a case where all the mobile stations can obtain transmission rates equal to or greater than the minimum transmission rate to be guaranteed of 32 kbps. In the case of FIG. 11, the ranking section 107 selects +2 dB and inputs it to the transmit power decision section 108. At the mobile station #3 having a CIR difference of +2 dB, the CIR of the received symbol exceeds the CIR to obtain the transmission rate of 32 kbps by 2 dB. Thus, in this case, the transmit power decision section 108 decides to decrease the transmit power of the symbol by 2 dB and instructs the transmit power control section 109 to do so. Following the instruction from the transmit power decision section 108, the transmit power control section 109 decreases the transmit power of the modulated symbol from the current level by 2 dB.

Through such transmit power control, the CIR of the received symbols at all the mobile stations become equal to or greater than the CIR to obtain the minimum transmission rate to be guaranteed of 32 kbps. When all the mobile stations obtain transmission rates equal to or greater than the minimum transmission rate to be guaranteed of 32 kbps and decrease transmit power, the base station decreases the transmit power by an amount corresponding to the least value out of the CIR differences (all plus values) notified from the plurality of mobile stations, and therefore all the mobile stations can obtain the minimum transmission rate to be guaranteed of 32 kbps in this case, too.

Thus, as with Embodiment 2, this embodiment performs transmit power control so that the minimum transmission rate to be guaranteed can be maintained at the mobile station having the lowest reception CIR, and can thereby provide transmission rates equal to or greater than the minimum transmission rate to be guaranteed at all the mobile stations in an MBMS and also perform appropriate transmit power control with excessive transmit power reduced.

Embodiment 4

The base station according to Embodiment 2 performs transmit power control using a CIR to obtain a minimum transmission rate to be guaranteed of 32 kbps as a reference. That is, when the CIR notified from a mobile station exceeds a CIR to obtain a transmission rate of 32 kbps, the base station reduces transmit power, and on the contrary when the CIR notified from the mobile station falls short of the CIR to obtain the transmission rate of 32 kbps (that is, when the mobile station cannot obtain decoded data), the base station increases transmit power. Thus, the former requires notification from the mobile station carrying out decoding at the transmission rate of 32 kbps and the latter requires notification from the mobile station that cannot obtain decoded data. In other words, there is no need for notification from the mobile station carrying out decoding at a higher transmission rate (here 64 kbps) than the minimum transmission rate to be guaranteed of 32 kbps and transmission of a communication signal from such a mobile station results in useless transmission.

Thus, in this embodiment, only the mobile station carrying out decoding at a transmission rate equal to or lower than a minimum transmission rate to be guaranteed out of a plurality of transmission rates provided for mobile stations notifies the reception CIR to the base station.

Figure 12:
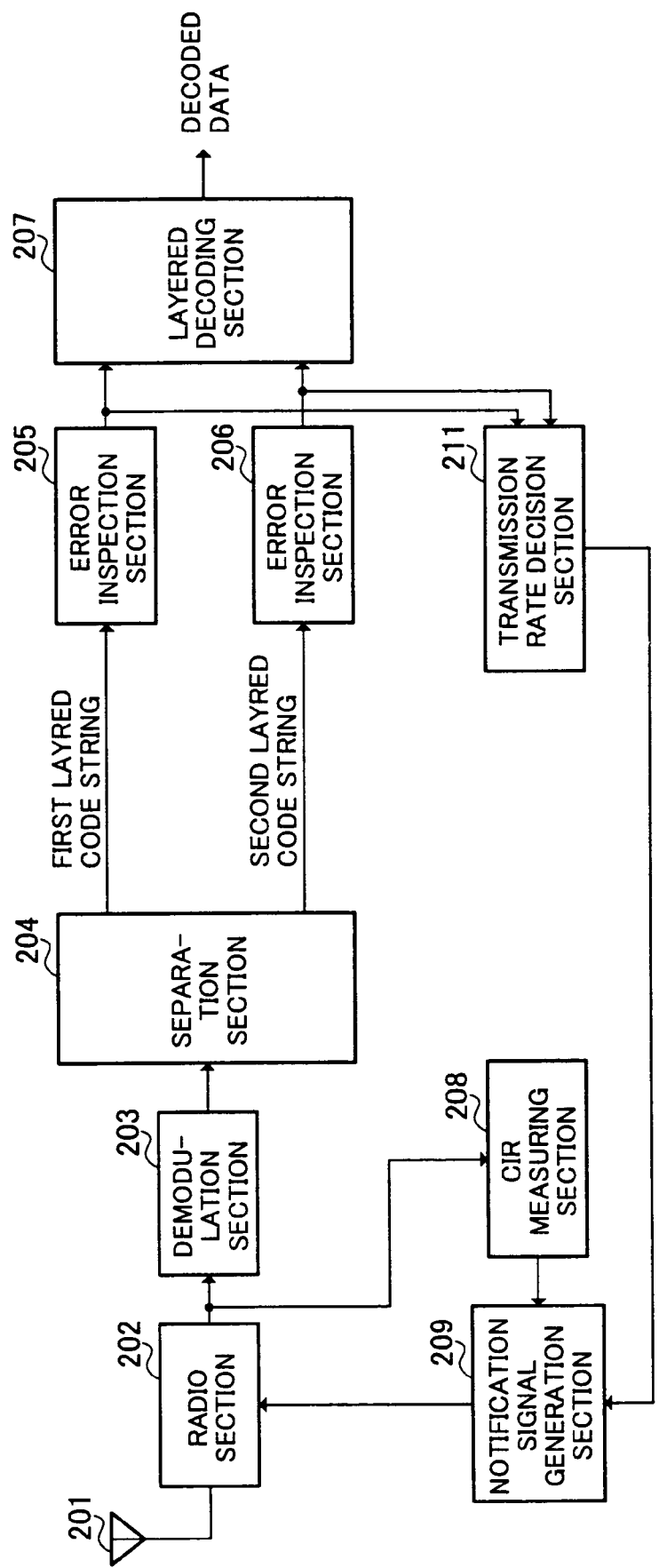
FIG. 12 is a block diagram showing a configuration of a mobile station according to Embodiment 4 of the present invention.

FIG. 12 is a block diagram showing a configuration of a mobile station according to Embodiment 4 of the present invention. However, detailed explanations of the same parts as those in the configuration in the foregoing embodiment will be omitted. The configuration of a base station which receives the notification signal sent from the mobile station according to this embodiment is the same as that of Embodiment 2, and therefore the explanations thereof will be omitted.

In the mobile station shown in FIG. 12, an error inspection section 205 inputs an error detection result of a first layer code string to a transmission rate decision section 211. On the other hand, an error inspection section 206 inputs an error inspection result of a second layer code string to the transmission rate decision section 211. The transmission rate decision section 211 decides the transmission rate of the decoded data based on the error inspection result. When the transmission rate is equal to or lower than a minimum transmission rate to be guaranteed (here 32 kbps) out of a plurality of transmission rates (here 64 kbps and 32 kbps) provided for the mobile station, the transmission rate decision section 211 instructs a notification signal generation section 209 to send a notification signal (signal to notify a CIR measured by a CIR measuring section 208). The notification signal generation section 209 sends the notification signal to the base station only when a transmission instruction is received from the transmission rate decision section 211.

Then, a method of deciding a transmission rate will be explained. As shown above, when there is no error in both the first layer code string and the second layer code string, a layered decoding section 207 performs decoding using both the first layer code string and the second layer code string. Thus, in this case, decoded data of 64 kbps is obtained. Therefore, when there is no error in both the first layer code string and the second layer code string, the transmission rate decision section 211 does not instruct the notification signal generation section 209 to send any notification signal.

Furthermore, when the first layer code string has no error and the second layer code string has some error, the layered decoding section 207 performs decoding using only the first layer code string. Thus, in this case, decoded data of 32 kbps is obtained. Therefore, when the first layer code string has no errors and the second layer code string has some error, the transmission rate decision section 211 instructs the notification signal generation section 209 to send a notification signal.

Furthermore, when the first layer code string has some error and the second layer code string has no error, the layered decoding section 207 cannot obtain decoded data through the second layer code string alone. That is, the transmission rate becomes 0 kbps. Thus, when the first layer code string has some error and the second layer code string has no error, the transmission rate decision section 211 instructs the notification signal generation section 209 to send a notification signal.

Furthermore, when both the first layer code string and the second layer code string have errors, the layered decoding section 207 cannot obtain decoded data through the second layer code string alone. That is, the transmission rate becomes 0 kbps. Therefore, when both the first layer code string and the second layer code string have errors, the transmission rate decision section 211 instructs the notification signal generation section 209 to send a notification signal.

By carrying out transmission control over a notification signal, the base station according to Embodiment 2 performs transmit power control based on the CIR notified from a mobile station carrying out decoding at or below a minimum transmission rate to be guaranteed.

Thus, this embodiment prevents transmission of useless notification signals from the mobile station, and can thereby increase the available channel capacity on the uplink (channel from the mobile station to the base station). Furthermore, compared to Embodiment 2, the number of CIRs to be ranked is decreased, and therefore the base station can reduce the amount of processing and time required for ranking processing and improve trackability of transmit power control as a consequence.

Embodiment 5

For the same reason as that explained in Embodiment 4, Embodiment 3 needs no notification from a mobile station carrying out decoding at a transmission rate higher than a minimum transmission rate to be guaranteed of 32 kbps, transmission of a communication signal from such a mobile station becomes useless transmission.

Therefore, in this embodiment, only a mobile station carrying out decoding at a transmission rate equal to or lower than a minimum transmission rate to be guaranteed out of a plurality of transmission rates provided for the mobile station notifies a base station of a difference between a reception CIR and reception quality to obtain the minimum transmission rate to be guaranteed.

Figure 13:
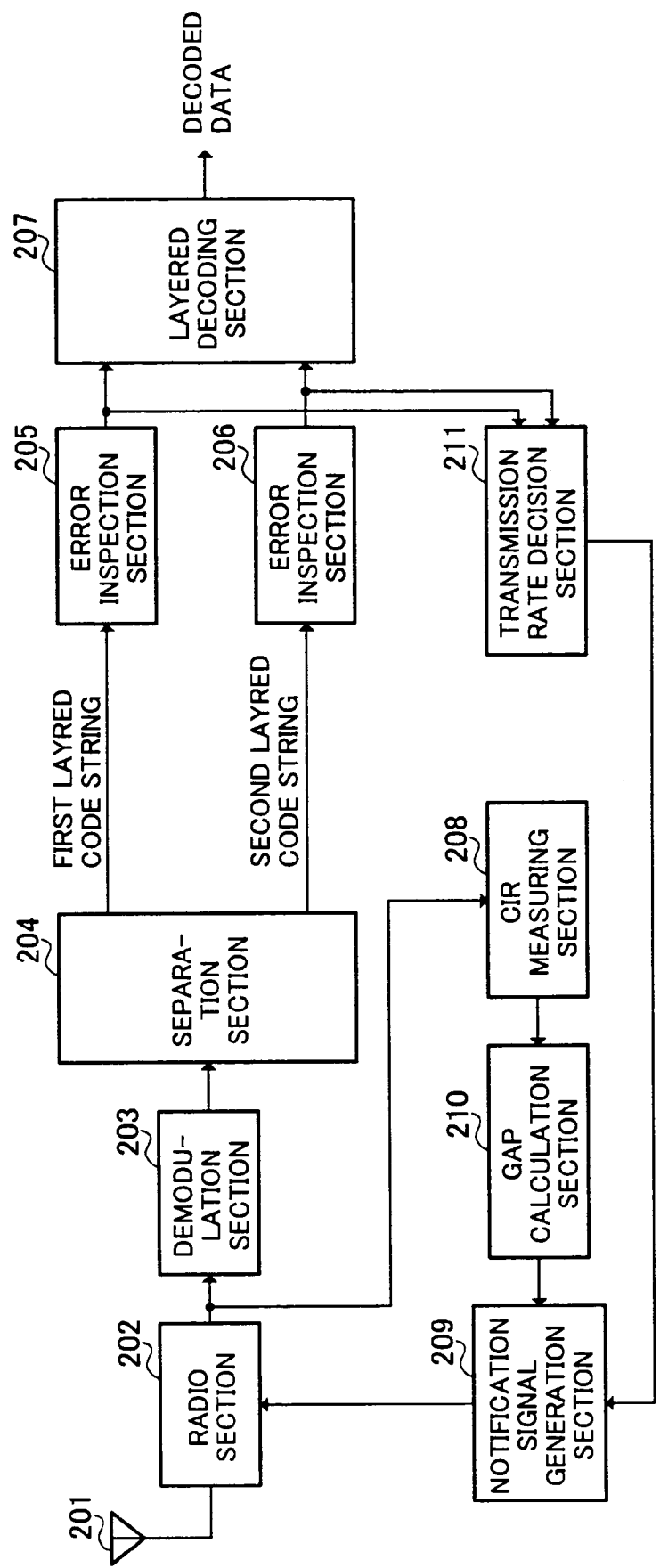
FIG. 13 illustrates a block diagram showing a configuration of a mobile station according to Embodiment 5 of the present invention.

FIG. 13 is a block diagram showing a configuration of a mobile station according to Embodiment 5 of the present invention. However, detailed explanations of the same parts as those in the configuration of the above described embodiment will be omitted. The configuration of the base station which receives a notification signal sent from the mobile station according to this embodiment is the same as that of Embodiment 3, and therefore explanations thereof will be omitted.

In the mobile station shown in FIG. 13, an error inspection section 205 inputs an error inspection result of a first layer code string to a transmission rate decision section 211. On the other hand, an error inspection section 206 inputs an error inspection result of a second layer code string to the transmission rate decision section 211. The transmission rate decision section 211 decides a transmission rate of the decoded data based on these error inspection results. When the transmission rate is equal to or lower than a minimum transmission rate to be guaranteed (here 32 kbps) out of a plurality of transmission rates (here 64 kbps and 32 kbps) provided for the mobile station, the transmission rate decision section 211 instructs a notification signal generation section 209 to send a notification signal (signal to notify a difference calculated by a gap calculation section 210). The notification signal generation section 209 sends a notification signal to the base station only when a transmission instruction is received from the transmission rate decision section 211. The method of deciding a transmission rate is the same as that in Embodiment 4, and therefore explanations thereof will be omitted.

When transmission control over the notification signal is performed in this way, the base station according to Embodiment 3 performs transmit power control based on the CIR difference notified from the mobile station carrying out decoding at a transmission rate equal to or lower than the minimum transmission rate to be guaranteed.

Thus, this embodiment prevents transmission of useless notification signals from the mobile station, and can thereby increase the available channel capacity on the uplink. Furthermore, compared to Embodiment 3, the number of CIRs to be ranked decreases at the base station, and therefore it is possible to reduce the amount of processing and time required for ranking processing. As a result, it is possible to improve trackability of transmit power control.

Embodiment 6

In this embodiment, a base station performs transmit power control according to instructions of increase/decrease from a mobile station.

Figure 14:
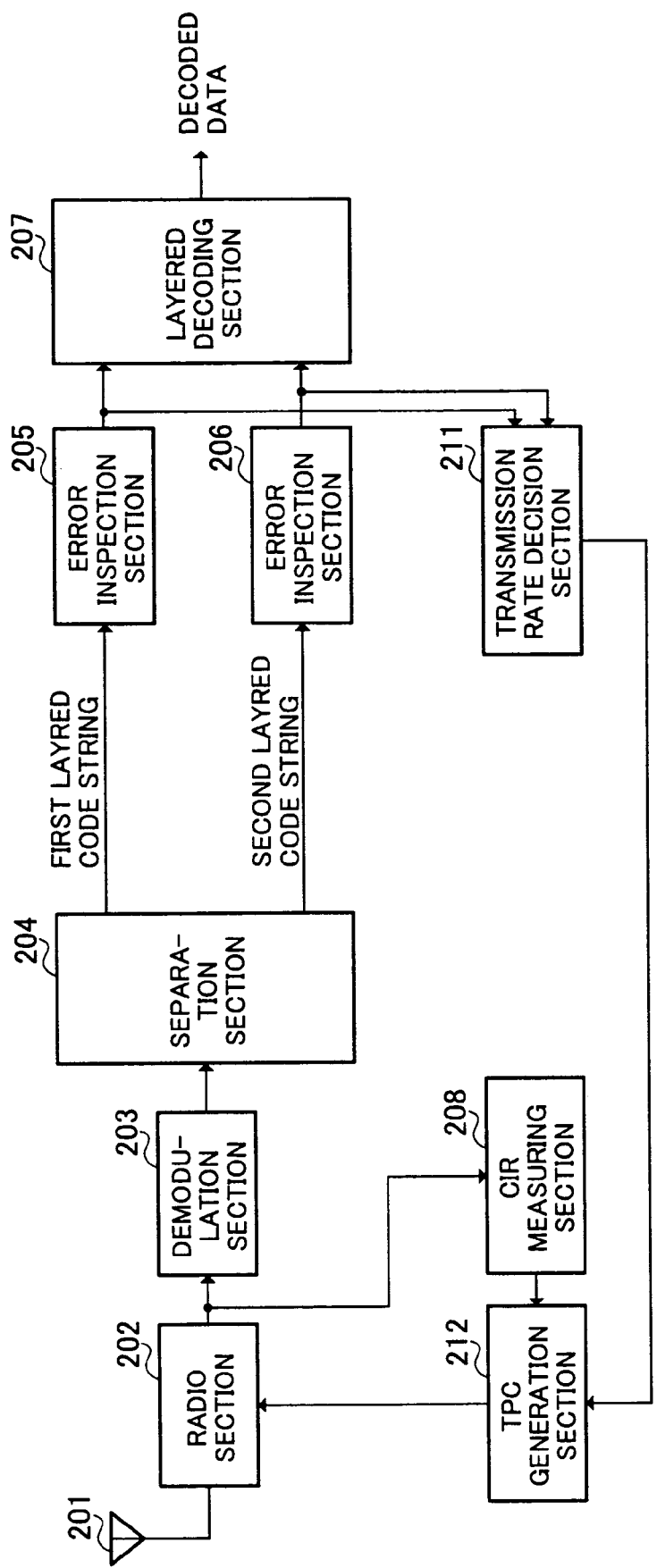
FIG. 14 is a block diagram showing a configuration of a mobile station according to Embodiment 6 of the present invention.
Figure 15:
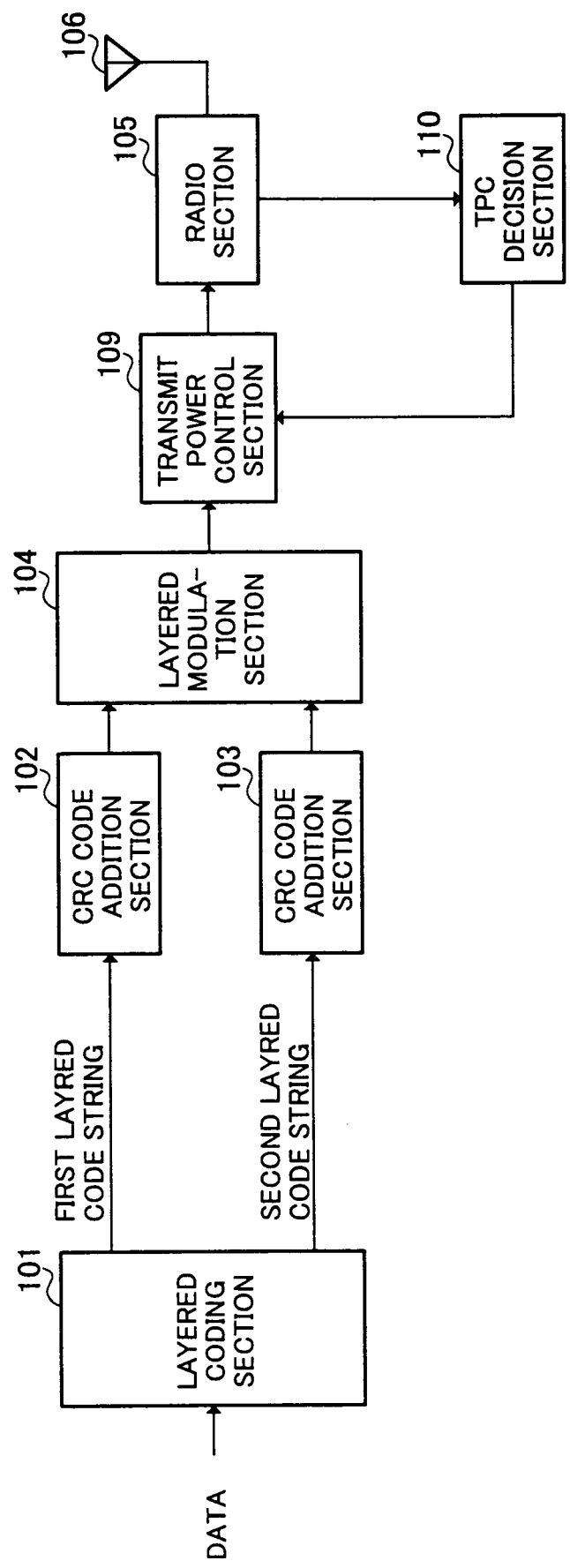
FIG. 15 is a block diagram showing a configuration of a base station according to Embodiment 6 of the present invention.

FIG. 14 is a block diagram showing a configuration of a mobile station according to Embodiment 6 of the present invention. Furthermore, FIG. 15 is a block diagram showing a configuration of a base station according to Embodiment 6 of the present invention. However, detailed explanations of the same parts as those in the configuration of the above described embodiment will be omitted.

In the mobile station shown in FIG. 14, a CIR measuring section 208 measures a CIR as reception quality of a received symbol and inputs the value to a TPC generation section 212. Furthermore, when the transmission rate is equal to or lower than a minimum transmission rate to be guaranteed (here 32 kbps) out of a plurality of transmission rates (here 64 kbps and 32 kbps) provided for the mobile station, the transmission rate decision section 211 instructs the TPC generation section 212 to generate and transmit a TPC (Transmission Power Control) signal. The method of deciding a transmission rate is the same as that in Embodiment 4. The TPC generation section 212 generates a TPC signal and sends it to the base station only when an instruction is received from the transmission rate decision section 211. The TPC signal is generated as follows.

That is, when the CIR measured by the CIR measuring section 208 falls short of the CIR to obtain the minimum transmission rate to be guaranteed of 32 kbps, the TPC generation section 212 generates a TPC signal for instructing an increase of transmit power and sends it to the base station. On the other hand, when the CIR measured by the CIR measuring section 208 exceeds the CIR to obtain the minimum transmission rate to be guaranteed of 32 kbps, the TPC generation section 212 generates a TPC signal for instructing a decrease of transmit power and sends it to the base station. However, a TPC signal is generated and sent only when an instruction is received from the transmission rate decision section 211. That is, only when the transmission rate is equal to or lower than the minimum transmission rate to be guaranteed (here 32 kbps) out of a plurality of transmission rates (here 64 kbps and 32 kbps) provided for the mobile station. This is for the same reason as that described in Embodiment 4.

Since the base station sends the same symbol to a plurality of mobile stations, the base station shown in FIG. 15 receives TPC signals from a plurality of mobile stations. In FIG. 15, a TPC signal received through an antenna 106 is subjected to radio processing such as down-conversion at a radio section 105 and input to a TPC decision section 110.

The TPC decision section 110 decides the content of an instruction indicated by the TPC signal, that is, decides whether the instruction is for an increase of transmit power or a decrease of transmit power. Then, when at least one of a plurality of instructions is an instruction for an increase of transmit power, the TPC decision section 110 instructs a transmit power control section 108 to increase transmit power. On the other hand, when all of the plurality of instructions are instructions for decreasing transmit power, the TPC decision section 110 instructs the transmit power control section 108 to decrease transmit power. The transmit power control section 109 increases or decreases the transmit power of a symbol according to instructions from the TPC decision section 110 by specified quantity.

Thus, according to this embodiment, only a mobile station carrying out decoding at a transmission rate equal to or lower than the minimum transmission rate to be guaranteed out of a plurality of transmission rates provided for the mobile station instructs the base station to increase or decrease transmit power, and therefore it is possible to provide transmission rates equal to or higher than the minimum transmission rate to be guaranteed to all mobile stations in an MBMS and perform appropriate transmit power control with excessive transmit power reduced. Furthermore, this embodiment prevents transmission of useless TPC signals from mobile stations, and can thereby increase a channel capacity available on the uplink.

Embodiment 7

In this embodiment, a mobile station notifies a base station of a difference between a CIR of a received symbol and a CIR to obtain a transmission rate requested by the own station out of a plurality of transmission rates provided for the mobile station.

Figure 16:
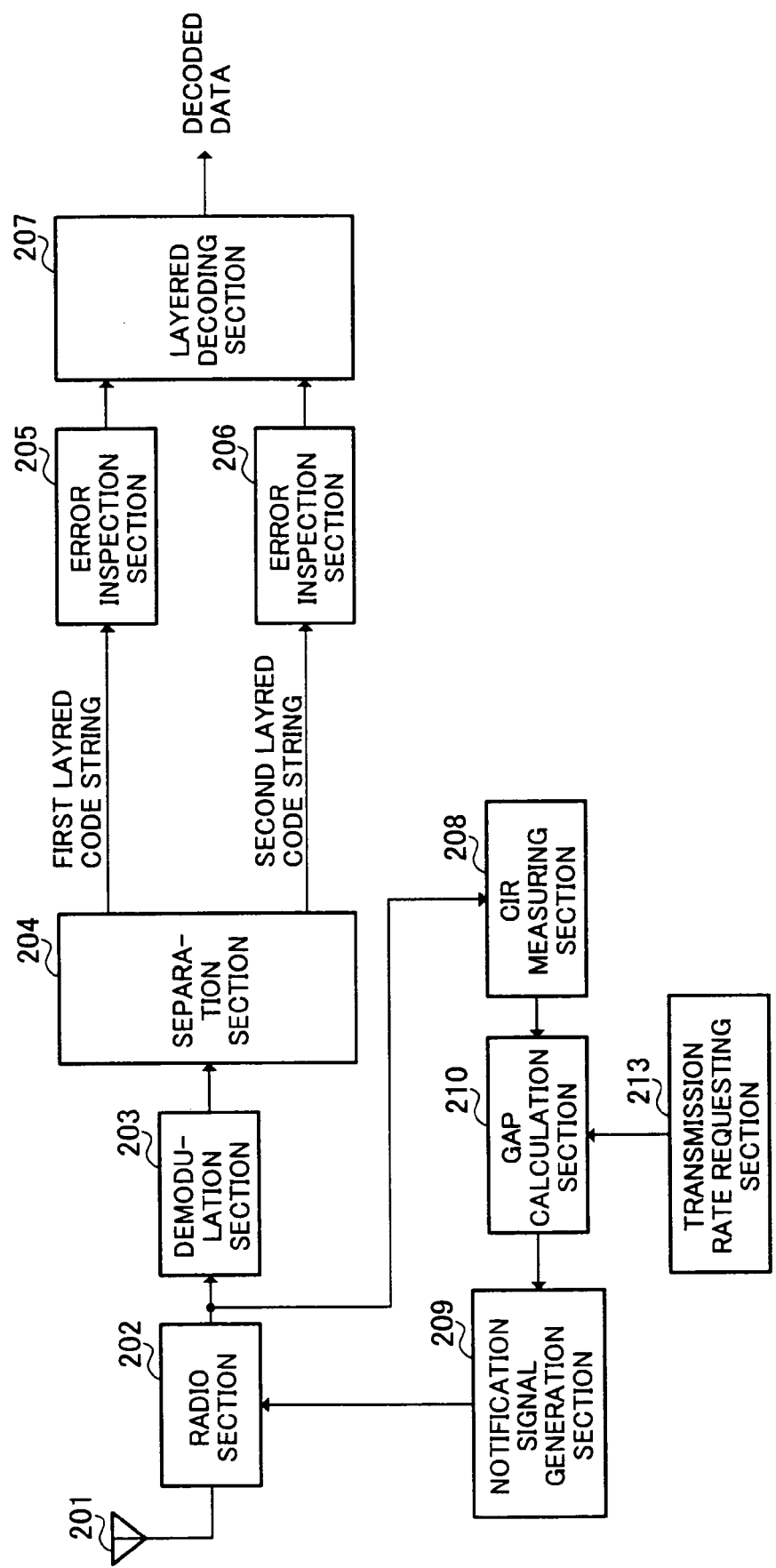
FIG. 16 is a block diagram showing a configuration of a mobile station according to Embodiment 7 of the present invention.

FIG. 16 is block diagram showing a configuration of a mobile station according to Embodiment 7 of the present invention. However, detailed explanations of the same parts as those in the configuration of the above described embodiment will be omitted.

In the mobile station shown in FIG. 16, a CIR measuring section 208 measures a CIR as reception quality of a received symbol and inputs the value to a gap calculation section 210. A transmission rate requesting section 213 inputs the value of a transmission rate requested by the own station to the gap calculation section 210. The transmission rate requested by the own station may be set by a mobile station user or set according to the content of decoded data and the setting method is not particularly limited. For example, when the decoded data is fast-moving image data, a high transmission rate is required and a relatively high transmission rate among a plurality of transmission rates provided for the mobile station is set. The gap calculation section 210 calculates a difference between the CIR measured by the CIR measuring section 208 and the CIR to obtain the transmission rate requested by the own station and inputs the value of the CIR difference to a notification signal generation section 209. The notification signal generation section 209 generates a signal to notify the difference calculated by the gap calculation section 210 and inputs it to a radio section 202. The notification signal is subjected to radio processing such as up-conversion at the radio section 202 and sent to the base station through an antenna 201.

The configuration of the base station according to this embodiment is the same as the configuration shown in FIG. 7 above. However, the operation of the ranking section 107 differs from that of the above described embodiment. The base station according to this embodiment will be explained below.

Since the base station sends the same symbol to a plurality of mobile stations, the base station shown in FIG. 7 receives notification signals from a plurality of mobile stations. In FIG. 7, a notification signal received through an antenna 106 is subjected to radio processing such as down-conversion at a radio section 105 and then input to a ranking section 107.

The ranking section 107 ranks CIR differences notified from a plurality of mobile stations and selects a value whose absolute value is largest out of differences having minus values (that is, when the CIR of a received symbol is lower than the CIR to obtain the transmission rate requested by the mobile station). When there is no difference having a minus value, the ranking section 107 selects a value whose absolute value is least out of differences having plus values (that is, when the CIR of a received symbol is higher than the CIR to obtain the transmission rate requested by the mobile station) The selected value is input to a transmit power decision section 108. The transmit power decision section 108 decides the transmit power of the symbol based on the value of the difference input from the ranking section 107. A specific example thereof will be shown below.

For example, suppose the base station receives notification signals from three mobile stations and obtains a result of ranking of CIR difference as shown in FIG. 10. That is, a case where a mobile station #1 can obtain a transmission rate equal to or higher than the transmission rate requested by the own station and mobile station #2 and mobile station #3 cannot obtain the transmission rates requested by the own stations. In the case of FIG. 10 above, the ranking section 107 selects −3 dB and inputs it to the transmit power decision section 108. At the mobile station #3 having a CIR difference of −3 dB, the CIR of a received symbol falls short of the CIR to obtain the transmission rate requested by the own station by 3 dB. Thus, in this case, the transmit power decision section 108 decides to increase the transmit power of the symbol by 3 dB and instructs a transmit power control section 109 to do so. The transmit power control section 109 increases the transmit power of the modulated symbol by 3 dB from the current transmit power according to the instruction from the transmit power decision section 108.

On the other hand, suppose the base station receives notification signals from three mobile stations and obtains a result of ranking of CIR differences as shown in FIG. 11 above. That is, it is a case where all mobile stations obtain transmission rates equal to or higher than the transmission rates requested by the own stations. In the case of FIG. 11 above, the ranking section 107 selects +2 dB and inputs it to the transmit power decision section 108. At the mobile station #3 having a CIR difference of +2 dB, the CIR of the received symbol exceeds the CIR to obtain the transmission rate requested by the own station by 2 dB. Thus, in this case, the transmit power decision section 108 decides to decrease the transmit power of the symbol by 2 dB and instructs the transmit power control section 109 to do so. The transmit power control section 109 decreases the transmit power of the modulated symbol from the current transmit power by 2 dB according to the instruction from the transmit power decision section 108.

By carrying out such transmit power control, the CIRs of the received symbol at all mobile stations become equal to or higher than the CIRs to obtain the transmission rates requested by the own stations. When transmission rates equal to or higher than the transmission rates requested by all the mobile stations are obtained and transmit power is decreased, the base station decreases transmit power by an amount corresponding to the least value of CIR differences (all plus values) notified from the plurality of mobile stations, and therefore even in this case, it is possible to obtain transmission rates equal to or higher than the transmission rates requested by the own stations of all the mobile stations.

Thus, this embodiment performs transmit power control so that transmission rates requested by mobile stations can be maintained, and can thereby provide transmission rates equal to or higher than transmission rates requested by the mobile stations to all the mobile stations and perform appropriate transmit power control with excessive transmit power reduced in an MBMS.

Embodiment 8

In this embodiment, a mobile station instructs a base station to increase/decrease transmit power based on a result of a comparison between a CIR of a received symbol and a CIR to obtain a transmission rate requested by the own station out of a plurality of transmission rates provided for the mobile station.

Figure 17:
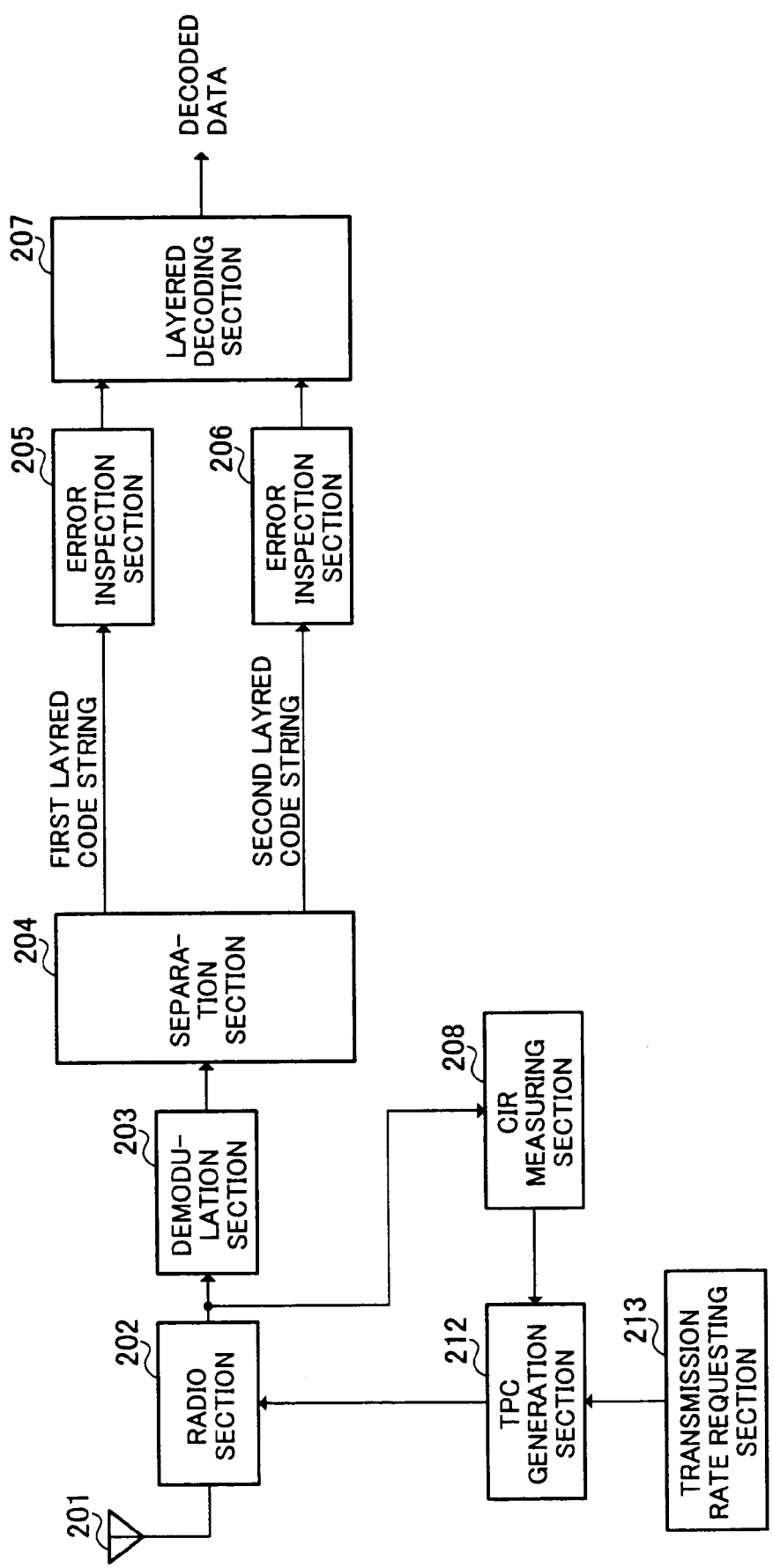
FIG. 17 is a block diagram showing a configuration of a mobile station according to Embodiment 8 of the present invention.

FIG. 17 is a block diagram showing a configuration of a mobile station according to Embodiment 8 of the present invention. However, detailed explanations of the same parts as those in the foregoing embodiment will be omitted. The configuration of a base station which receives a TPC signal sent from the mobile station according to this embodiment is the same as that of Embodiment 6, and therefore explanations thereof will be omitted.

In the mobile station shown in FIG. 17, a CIR measuring section 208 measures a CIR as reception quality of a received symbol and inputs the value to a TPC generation section 212. A transmission rate requesting section 213 inputs the value of a transmission rate requested by the own station to the TPC generation section 212. The TPC generation section 212 generates a TPC signal and sends it to the base station. A TPC signal is generated as follows.

That is, when the CIR measured by the CIR measuring section 208 is lower than the CIR to obtain the transmission rate requested by the own station, the TPC generation section 212 generates a TPC signal for instructing an increase of transmit power and sends it to the base station. On the other hand, when the CIR measured by the CIR measuring section 208 is equal to or higher than the CIR to obtain the transmission rate requested by the own station, the TPC generation section 212 generates a TPC signal for instructing a decrease of transmit power and sends it to the base station.

Thus, according to this embodiment, the mobile station instructs an increase or decrease of transmit power based on a result of a comparison between a CIR of a received symbol and a CIR to obtain a transmission rate requested by the own station, and therefore it is possible to provide transmission rates equal to or higher than transmission rates requested by the mobile station to all the mobile stations in an MBMS and perform appropriate transmit power control with excessive transmit power reduced.

As described above, the present invention can perform appropriate control on reception quality and transmit power for each mobile station in an MBMS.

This application is based on the Japanese Patent Application No.2002-197772 filed on Jul. 5, 2002, entire content of which is expressly incorporated by reference herein.

INDUSTRIAL APPLICABILITY

The present invention is applicable to a radio communication base station apparatus used in a mobile communication system and a radio communication mobile station apparatus which communicates with this radio communication base station apparatus.

What is claimed is:

1. A radio communication mobile station apparatus comprising:
   a receiving section that receives one symbol transmitted from a radio communication base station apparatus;
   a demodulation section that demodulates the one symbol to obtain a base layer encoded string and an enhanced layer encoded string;
   an inspection section that performs error inspection of the base layer encoded string and the enhanced layer encoded string;
   a measuring section that measures reception quality of the one symbol; and
   a transmission section that transmits a notification signal for notifying the reception quality to the radio communication base station apparatus when one or both of the base layer encoded string and the enhanced layer encoded string have an error and that does not transmit the notification signal for notifying the reception quality to the radio communication base station apparatus when neither the base layer encoded string nor the enhanced layer encoded string has an error,
   wherein the radio communication base station apparatus:
      divides input data into base layer data and enhanced layer data and encodes the base layer data and the enhanced layer data to obtain the base layer encoded string and the enhanced layer encoded string,
      assigns the base layer encoded string to a higher bit of a plurality of bits forming the one symbol and the enhanced layer encoded string to a lower bit of the plurality of bits forming the one symbol to generate the one symbol, and
      transmits the one symbol.

* * * * *